United States Patent
Ramesh et al.

(10) Patent No.: US 9,703,851 B2
(45) Date of Patent: Jul. 11, 2017

(54) SYSTEM AND METHOD FOR OPTIMIZING COMPUTATION OF METRICS FACILITATING MONITORING OF SERVICE LEVEL AGREEMENTS (SLA)

(71) Applicant: Tata Consultancy Services Limited, Maharashtra (IN)

(72) Inventors: Rajini Ramesh, Chennai (IN); Srikanth Tupakula, Chennai (IN); Reshma Sherly, Chennai (IN); Dhinakaran Pandian, Chennai (IN)

(73) Assignee: TATA CONSULTANCY SERVICES LIMITED, Mumbai, Maharashtra (IN)

( * ) Notice: Subject to any disclaimer, the term of this patent is extended or adjusted under 35 U.S.C. 154(b) by 422 days.

(21) Appl. No.: 14/538,347

(22) Filed: Nov. 11, 2014

(65) Prior Publication Data

US 2015/0134593 A1 May 14, 2015

(30) Foreign Application Priority Data

Nov. 11, 2013 (IN) .......................... 3541/MUM/2013

(51) Int. Cl.
G06F 17/30 (2006.01)
G06Q 10/06 (2012.01)
H04L 12/26 (2006.01)

(52) U.S. Cl.
CPC ... *G06F 17/30563* (2013.01); *G06Q 10/0637* (2013.01); *H04L 43/04* (2013.01)

(58) Field of Classification Search
USPC ............... 707/607, 609, 687, 705, 790, 821
See application file for complete search history.

(56) References Cited

U.S. PATENT DOCUMENTS

| 8,515,948 B2 | 8/2013 | Chen |
| 2005/0102284 A1 | 5/2005 | Srinivasan et al. |
| 2013/0191145 A1* | 7/2013 | Nudd ............... G06Q 10/06311 705/2 |

(Continued)

FOREIGN PATENT DOCUMENTS

EP 1229685 B1 4/2006

OTHER PUBLICATIONS

IBM "Improving Query Optimization With Materialized Query Tables".

(Continued)

*Primary Examiner* — Sana Al Hashemi
(74) *Attorney, Agent, or Firm* — Thompson Hine LLP

(57) ABSTRACT

A system and method for optimizing the computation of metrics facilitating monitoring of service level agreements (SLA) in an IT-enabled framework to reduce computational overhead. A receiving module receives data associated with activities performed by one or more service providers. A transforming module transforms the data into a user-defined data structure using a transforming technique. A selecting module selects an attribute and parameters associated with a key performance indicator (KPI) of the one or more service providers. A view creating module creates a materialized view of the user-defined data structure based on the selected attribute. A query generating module m generates a query to be executed on the materialized view. A metric executing module executes the query on the materialized view in order to compute the metric.

14 Claims, 4 Drawing Sheets

(56) References Cited

U.S. PATENT DOCUMENTS

2013/0197957 A1* 8/2013 Nudd .............. G06Q 10/06311
  705/7.14
2013/0304533 A1* 11/2013 Nudd .............. G06Q 10/06311
  705/7.15

OTHER PUBLICATIONS

Betreuer: Prof. Dr. Heinz Schweppe & Dr. Agnes Voisard, "Materialized View Design: An Experimental Study" Diplomarbeit Von Vikas Kapoor, Institut Für InformatikFachbereich Mathematik Und InformatikFreie Universität Berlin, Apr. 1, 2001.

* cited by examiner

SYSTEM AND METHOD FOR OPTIMIZING COMPUTATION OF METRICS FACILITATING MONITORING OF SERVICE LEVEL AGREEMENTS (SLA)

CROSS-REFERENCE TO RELATED APPLICATIONS AND PRIORITY

The present application claims priority to Indian Provisional Patent Application No. 3541/MUM/2013, filed on 11 Nov. 2013, the entirety of which is hereby incorporated by reference.

TECHNICAL FIELD

The present disclosure described herein, in general, relates to Information Technology (IT) systems, and more particularly to a system and method for optimizing computation of metrics facilitating monitoring of a Service Level Agreement (SLA) in an IT-enabled framework.

BACKGROUND

In a typical IT-enabled framework, several IT services may be facilitated through one or more service providers. Examples of the IT services may include application development services, application testing services, application maintenance services, business process outsourcing (BPO) services and technology consulting services. These IT services are delivered by one or more service providers as per an SLA executed between one or more service providers and a customer. The SLA may be a contract signed by the customer with each of the one or more service providers. In order to ensure timely and quality delivery of the IT services, collaboration and/or co-ordination may be required between each of the one or more service providers and the customer. Therefore, tracking of the performance of the one or more service providers in terms of service levels as per the SLA may be desired.

The tracking of the performance may be implemented by monitoring current service levels and expected service levels for the each of the one or more service providers. In order to monitor the current and the expected service levels, data associated with the IT services may be acquired from the one or more service providers. The performance may be tracked by executing queries on a database storing the data. However, since the data may be of large volume and may be of distinct formats, the query execution and accordingly the metric performance monitoring may require more processing time. Further, since the execution of the query requires more processing time, it may eventually affect processing speed of the systems being capable of monitoring/tracking the performance and thereby results in computational overhead in the systems.

SUMMARY

Before the present systems and methods are described, it is to be understood that this application is not limited to the particular systems and methodologies described, as there can be multiple possible embodiments which are not expressly illustrated in the present disclosures. It is also to be understood that the terminology used in the description is for the purpose of describing the particular versions or embodiments only, and is not intended to limit the scope of the present application. This summary is provided to introduce concepts related to systems and methods for optimizing computation of metric facilitating monitoring of SLAs in an IT-enabled framework, and these concepts are further described below in the detailed description. This summary is not intended to identify essential features of the claimed disclosure nor is it intended for use in determining or limiting the scope of the claimed disclosure.

In one implementation, a system for optimizing computation of a metric facilitating monitoring of SLAs in an IT-enabled framework to reduce computational overhead is disclosed. In one aspect, the system may include a processor and a non-transitory memory coupled to the processor for executing a plurality of modules present in the memory. The plurality of modules may further include a receiving module, a transforming module, a selecting module, a view creating module, a query generating module and a metric executing module. The receiving module receives data associated with activities performed by one or more service providers. The transforming module transforms the data into a user-defined data structure using a transforming technique. The user-defined data structure includes one or more attributes associated with the data. The selecting module selects an attribute of the one or more attributes. Further, the selecting module may select one or more parameters associated with a key performance indicator of the one or more service providers. The view creating module creates a materialized view of the user-defined data structure based on the selected attribute. The materialized view may represent a database table comprising sub-set of the data. The sub-set is retrieved from the data based upon the selected attribute. The query generating module generates a query to be executed on the materialized view. The query generated may include the attribute selected and the one or more parameters selected via the selecting module. The metric executing module executes the query on the materialized view to compute the metric. The execution of the query on the materialized view facilitates the optimization of the computation of the metric.

In another implementation, a method for optimizing computation of a metric facilitating monitoring of SLAs in an IT-enabled framework to reduce computational overhead is disclosed. In one aspect, the method includes providing a processor and a non-transitory memory coupled to the processor, where the processor is capable of executing a plurality of modules stored in the memory. The method includes a step of receiving data associated with activities performed by one or more service providers. The method further includes a step of transforming the data into a user-defined data structure using a transforming technique. The user-defined data structure includes one or more attributes associated with the data. The method further includes a step of selecting an attribute of the one or more attributes and one or more parameters associated with a key performance indicator of the one or more service providers. The method further includes a step of creating a materialized view of the user-defined data structure based on the selected attribute. The materialized view may represent a database table of a sub-set of the data. The sub-set is retrieved from the data based upon the attribute selected. The method further includes a step of generating a query to be executed on the materialized view. The query generated includes the attribute selected and the one or more parameters selected via the selecting module. The method further includes a step of executing the query on the materialized view in order to compute the metric. The execution of the query on the materialized view facilitates the optimization of the computation of the metric.

In yet another implementation, a non-transitory computer program product having embodied thereon a computer program comprising a set of instructions for optimizing computation of a metric facilitating monitoring of SLAs in an IT-enabled framework to reduce computational overhead is disclosed. In one aspect, the set of instructions includes instructions for receiving data associated with activities performed by one or more service providers. The set of instructions further includes instructions for transforming the data into a user-defined data structure using a transforming technique. The user-defined data structure includes one or more attributes associated with the data. The set of instructions further includes instructions for selecting an attribute of the one or more attributes and one or more parameters associated with a key performance indicator of the one or more service providers. The set of instructions further includes instructions for creating a materialized view of the user-defined data structure based on the selected attribute. The materialized view may represent a database table of a sub-set of the data. The sub-set is retrieved from the data based upon the selected attribute. The set of instructions further includes instructions for generating a query to be executed on the materialized view. The query generated includes the attribute selected and the one or more parameters selected via the selecting module. The set of instructions further includes instructions for executing the query on the materialized view in order to compute the metric. The execution of the query on the materialized view facilitates the optimization of the computation of the metric.

BRIEF DESCRIPTION OF THE DRAWINGS

The foregoing detailed description of embodiments is better understood when read in conjunction with the appended drawings. For the purpose of illustrating the disclosure, there is shown in the present document example constructions of the disclosure; however, the disclosure is not limited to the specific methods and apparatus disclosed in the document and the drawings.

The detailed description is described with reference to the accompanying figures. In the figures, the left-most digit(s) of a reference number identifies the figure in which the reference number first appears. The same numbers are used throughout the drawings to refer to like features and components.

DETAILED DESCRIPTION

Figure 1:
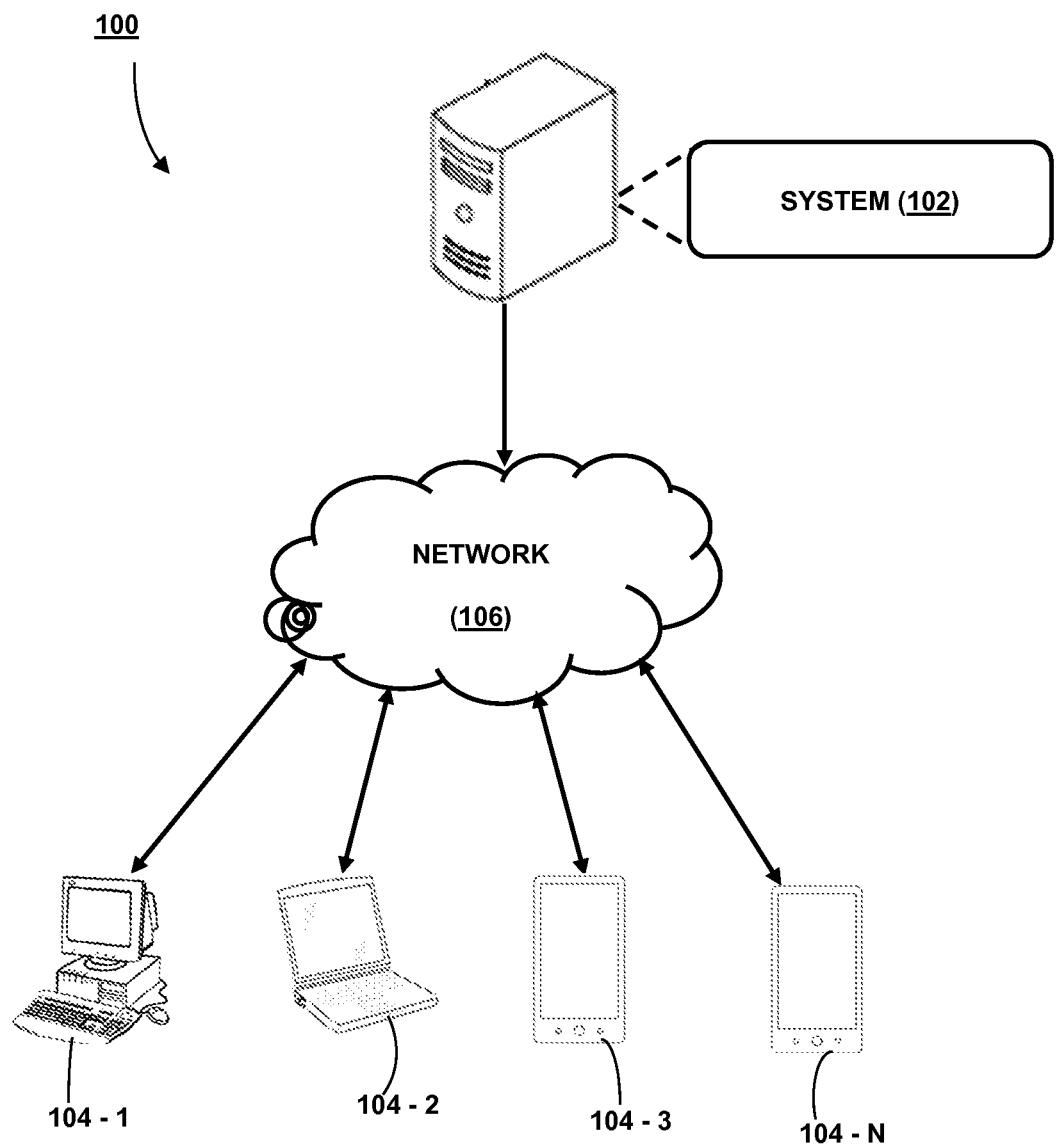
FIG. 1 illustrates a network implementation of a system for optimizing computation of a metric facilitating monitoring of SLAs in an IT-enabled framework, in accordance with an embodiment of the present disclosure.

Some embodiments of this disclosure, illustrating all its features, will now be discussed in detail. The words "comprising," "having," "containing," and "including," and other forms thereof, are intended to be equivalent in meaning and to be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

Systems and methods for optimizing the computation of a metric facilitating monitoring of SLAs in an IT-enabled framework are described. In one aspect, data associated with activities performed by the one or more service providers is received. After the receipt of the data, the data may be transformed into a user-defined data structure using a transforming technique. In one example, the transformation technique may comprise an extraction, transformation, and loading (ETL) technique that transforms the data into the user-defined data structure. The user-defined data structure comprises one or more attributes associated with the data. The one or more attributes may be defined by defining a name of each attribute, a class type of each attribute, a data type of each attribute, and a description of each attribute.

After the definition of each attribute, an attribute of the one or more attributes may be selected for creating a materialized view of the user-defined data structure. The materialized view may represent a database table comprising a sub-set of the data which is retrieved from the data based upon the selected attribute. After the creation of the materialized view, a query to be executed on the materialized view may be generated. The query may be generated by selecting one or more parameters associated with a key performance indicator of the one or more service providers. In one example, the one or more parameters may comprise periodicity of the query; frequency of the query; complexity associated with the query; an SLA associated with the one or more service providers or a combination thereof. The query generated may comprise the attribute and the one or more parameters.

After the generation of the query, the query may be executed on the materialized view in order to compute the metric that enables monitoring of the SLAs associated with the one or more service providers. In one example, the metric may be computed by initiating a batch process at a pre-defined time interval. The execution of the query facilitates generating a report depicting service level compliance data associated with the one or more service providers, and the report enables monitoring of the performance of the one or more service providers.

While aspects of described system and method for optimizing computation of a metric facilitating monitoring of SLAs in an IT-enabled framework may be implemented in any number of different computing systems, environments, and/or configurations, the embodiments are described in the context of the following exemplary system.

Referring now to FIG. 1, a network implementation 100 of a system 102 for optimizing the computation of a metric facilitating monitoring of SLAs in an IT-enabled framework is disclosed. The system 102 may receive data associated with activities performed by the one or more service providers. The system 102 may transform the data into a user-defined data structure using a transforming technique. The user-defined data structure comprises one or more attributes associated with the data. The system 102 may select an attribute of the one or more attributes and one or more parameters associated with a key performance indicator of the one or more service providers. The system 102 may create a materialized view of the user-defined data structure based on the attribute selected. The materialized view may represent a database table comprising a sub-set of the data. The sub-set is retrieved from the data based upon the selected attribute. The system 102 may generate a query to be executed on the materialized view. The generated query may comprise the selected attribute and the one or more parameters selected via the selecting module. The system 102 may execute the query on the materialized view in order to compute the metric. The execution of the query on the materialized view facilitates the optimization of the computation of the metric.

Although the present disclosure is explained considering that the system 102 is implemented on a server, it may be understood that the system 102 may also be implemented in a variety of computing systems, such as a laptop computer, a desktop computer, a notebook, a workstation, a mainframe computer, a server, a network server, a cloud-based computing environment and the like. It will be understood that the system 102 may be accessed by multiple users through one or more devices 104-1, 104-2, 104-3, . . . 104-N, collectively referred to as devices 104 hereinafter, or applications residing on the devices 104. In one implementation, the system 102 may comprise a cloud-based computing environment in which a user may operate individual computing systems configured to execute remotely located applications. Examples of the devices 104 may include, but are not limited to, a portable computer, a personal digital assistant, a handheld device, and a workstation. The devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

Figure 2:
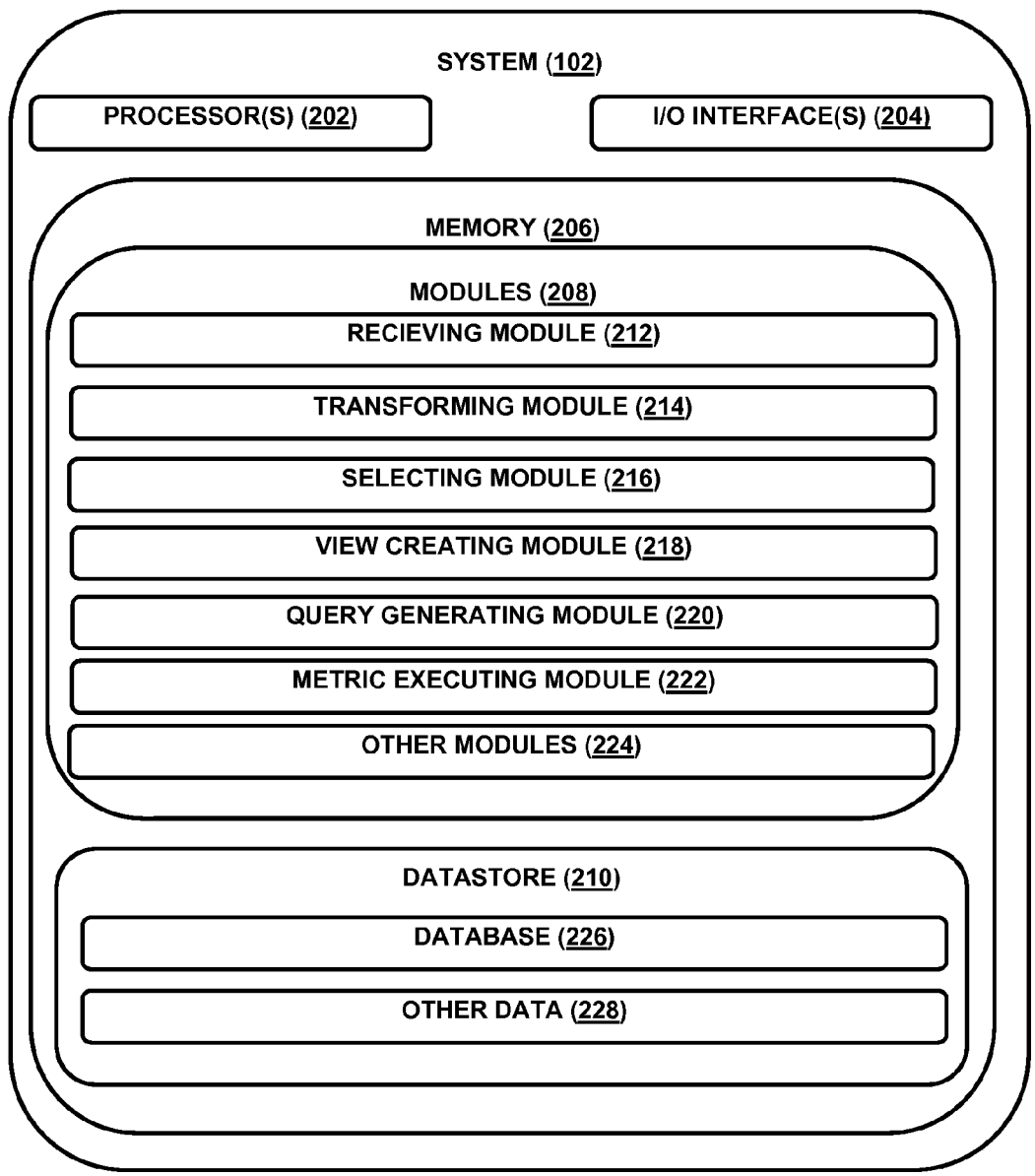
FIG. 2 illustrates the system of FIG. 1, in accordance with an embodiment of the present disclosure.

Referring now to FIG. 2, the system 102 is illustrated in accordance with an embodiment of the present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and a data store 210.

The modules 208 include routines, programs, objects, components, data structures, etc., which perform particular tasks or implement particular abstract data types. In one implementation, the modules 208 may include a receiving module 212, a transforming module 214, a selecting module 216, a view creating module 218, a query generating module 220, a metric executing module 222 and other modules 224. The other modules 224 may include programs or coded instructions that supplement applications and functions of the system 102. The modules 208 described herein may be implemented as software modules that may be executed in the cloud-based computing environment of the system 102.

The data store 210, amongst other things, serves as a repository for storing data processed, received, and generated by one or more of the modules 208. The data store 210 may also include a database 226, and other data 228. The other data 228 may include data generated as a result of the execution of one or more modules in the other modules 224.

Figure 3:
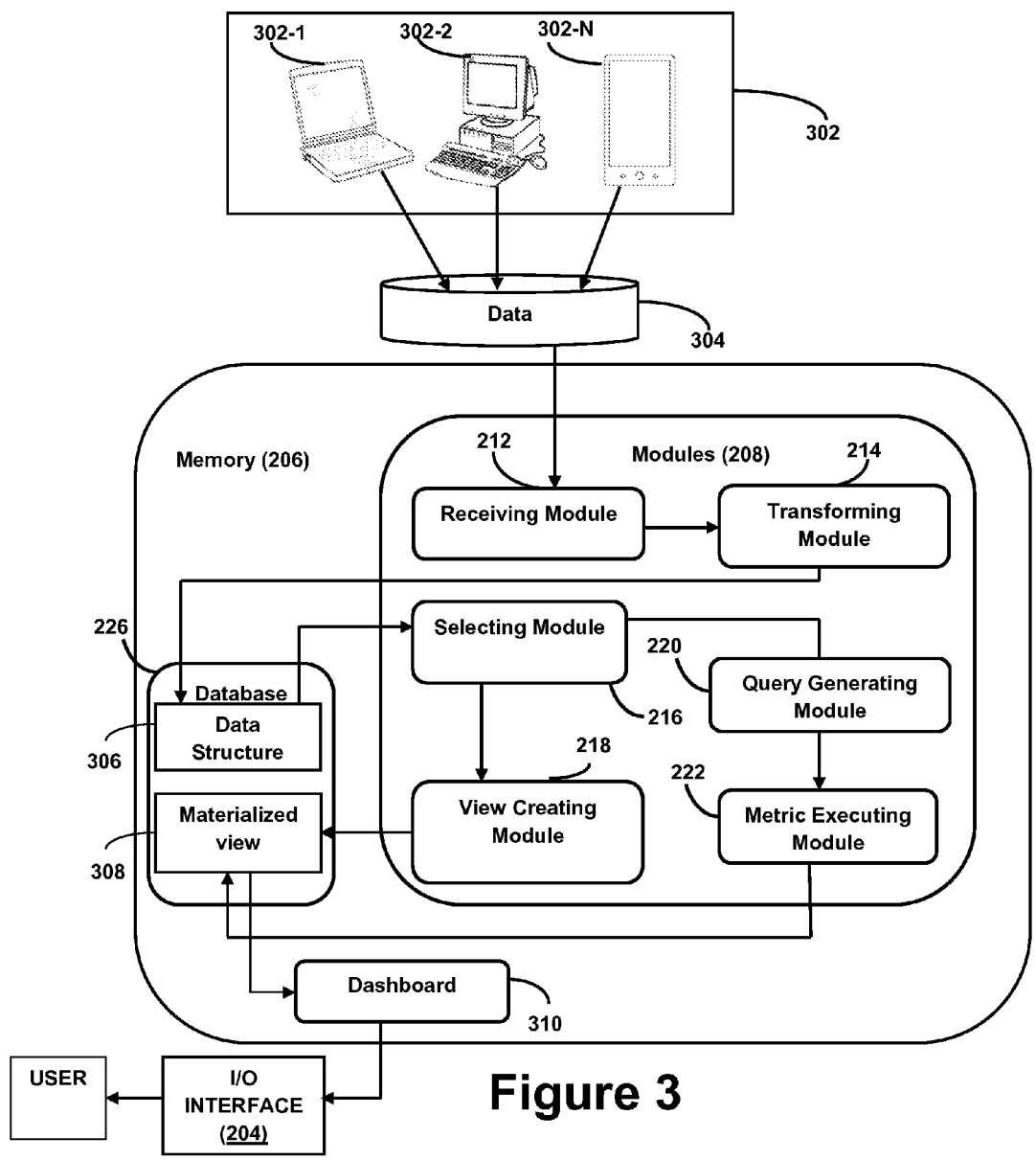
FIG. 3 illustrates various modules of the system of FIG. 1, in accordance with an embodiment of the present disclosure.

In one implementation, at first, a user may use one of the devices 104 to access the system 102 via the I/O interface 204. The user may register themselves using the I/O interface 204 in order to use the system 102. The working of the system 102 may be explained in detail in FIGS. 3 and 4 explained below. Referring to FIG. 3, a detailed working of various modules along with other components of the system 102 is illustrated, in accordance with an embodiment of the present disclosure. The system 102 for optimizing computation of a metric facilitating monitoring of SLAs in an IT-enabled framework is described herein in detail below.

Receiver Module 212

Referring now to FIG. 3, in one embodiment, the functionalities of the receiving module 212 have been described. As illustrated, the receiving module 212 may be configured to receive data 304 from one or more service providers 302-1, 302-2, . . . 302-N, collectively referred hereinafter as 302. The data 304 may be associated with one or more activities performed by the one or more service providers 302 corresponding to one or more IT services. Examples of the IT services may comprise application development services, application testing services, application maintenance services, business process outsourcing (BPO) services and technology consulting services. Further, the IT services may be of one or more hierarchical levels including an application level, a tower level and an account level. The receiving module 212 may receive the data 304 from an excel file, a remote database, or via a File Transfer Protocol (FTP). The data 304 may be of different data formats or data types depending upon the source (at least one of 302-1, 302-2, . . . 302-N) from where it may be received. The data 304 may be received into a single table partitioned on the basis of the type of the one or more resources and the one or more service providers 302. Partition tables or Resource data tables may comprise sub-sets of the data that may be used for executing metrics and generating reports thereafter. Each resource data table may relate to other resource data tables. In one example, one resource table may be a child to some other resource data table. The data 304 may be stored in the database 226.

Transforming Module 214

After the data 304 is received, the data may be transformed to a unified format using the transforming module 214, as illustrated in FIG. 3. In one implementation, the data 304 may be transformed into a user-defined data structure 306 via the transforming module 214. Specifically, the transforming module 214 may transform a sub-set of the data 304 into a single format in the form of the user-defined data structure 306, irrespective of the source from which the sub-set may be received. Thus, the user-defined data structure 306 is independent of the data types and the data formats associated with the data 304 received from the one or more service providers 302. In one example, the transforming module 214 may transform the data 304 into the user-defined data structure 306 using a transformation technique like extraction, transformation and loading (ETL) technique. The transforming module 214 may utilize an ETL tool which may act as a software agent facilitating the transformation of the data 304 into the user-defined data structure 306. The user-defined data structure 306 may be stored in the database 226.

The user-defined data structure 306 may comprise one or more attributes associated with the data 304. Further, each attribute of the one or more attributes may be defined by defining a name of each attribute, a class type of each attribute, a data type of each attribute, and a description of each attribute. In one embodiment, the one or more attributes may be mapped with one or more headers associated with the data 304. Thus, the data 304 eventually may be stored in the user-defined data structure 306 in a structured form on the basis of the one or more attributes defined in the user-defined data structure 306. Since, the user-defined data structure 306 is of the unified format, irrespective of the source from where each sub-set of the data 304 is received, each of the sub-sets may be transformed into the user-defined data structure 306 having the one or more attributes.

Selecting Module 216

Subsequent to the transformation of the data 304 into the user-defined data structure 306, an attribute from the one or more attributes may be selected by the selecting module 216. The attribute may be selected in order to enable the view creating module 218 to create a materialized view of the user-defined data structure 306 as explained in detail later in the subsequent paragraphs. Further, the selecting module 216 may be configured to select one or more parameters associated with a key performance indicator (KPI) for the one or more service providers 302. The one or more parameters may be selected in order to enable the query generating module 220 to generate the query as explained in detail later in the subsequent paragraphs.

View Creating Module 218

Based upon the selection of the attribute of the one or more attributes, the view creating module 218, as shown in FIG. 3, may be configured to create a materialized view 308 of the user-defined data structure 306. The attribute of the one or more attributes may be selected from respective resource data tables. The view creating module 218, at an instance of the selection of the attribute, enables formation of a join query that facilitates the joining of all related resource data tables. The view creating module 218 may initiate a trigger in the database 226 in order to create the materialized view 308. Thus, the creation of the materialized view is based on the selection of the attribute of the one or more attributes. The materialized view 308 may be stored as a table in a different schema in the database 226.

Query Generating Module 220

In one embodiment, the materialized view 308, as illustrated in FIG. 3, may be utilized for generating a query to be executed in order to compute a metric associated with the tracking/monitoring of the performance. As shown, the query generating module 220 may be configured to generate the query based on the attribute selected from the one or more attributes of the user-defined data structure 306. Further, the query may be generated by the query generating module 220 based on the one or more parameters selected via the selecting module 216. The one or more parameters may be associated with the key performance indicator (KPI) for the one or more service providers 302. The one or more parameters may enable defining the metric to be executed on the materialized view 308. In one example, the one or more parameters may comprise a name of the query, a description of the query, a periodicity of the query, a resource data table associated with the query, a frequency of the query, a complexity associated with the query, an SLA associated with the one or more service providers and a combination thereof Therefore, the query generated by the query generating module 220 may comprise the attribute and the one or more selected parameters. Further, the query may be modified based upon the selection of various filtering criteria including a grouping option, a mathematical function, a date of execution of the query and combinations thereof Once the query is generated, it may be executed using the metric executing module 222 in order to compute the metric facilitating the tracking and/or monitoring of the performance of the one or more service providers, which is explained in detail below.

Metric Executing Module 222

Subsequent to the generation of the query, the metric executing module 222 may be configured to execute the query on the materialized view 308. Thus, the present disclosure enables retrieving a sub-set of the data 304 from the materialized view 308 instead of querying the entire resource data table and getting data. Specifically, the metric executing module 222 may execute the query on the materialized view in order to compute the metric, which facilitates monitoring of the performance of the one or more service providers as per the SLA. The configuration of the metric computation is described below:

In one embodiment, the metric executing module 222 may initiate a request for deploying a process associated with the computation of the metric at a pre-defined time interval. The request may be forwarded to a control module (not shown in figure) like a struts servlet which may initiate a batch process to trigger the computation of the metric. Further, the metric executing module 222 may initiate the computation of the metric using a business logic like Enterprise Java Bean (EJB). The results of the execution and thereby the computation of the metric may be stored in the database 226. Therefore, the present disclosure is characterized in optimization of the query and thereby reduction in overhead of the system 102. This results in faster execution of the query and hence enables retrieval of the results in a much faster way. Hence, the present disclosure is further characterized in the optimization of the computation of the metric that facilitates the monitoring/tracking of the performance of the one or more service providers 302 as shown in FIG. 3.

Dashboard 310

After the execution of the query in order to compute the metric, the results depicting the performance of the one or more service providers 302 may be derived. The results may be displayed in a pictorial form on the dashboard 310 as shown in FIG. 3. The dashboard 310 may be visualized by the user via the I/O interface 204. The dashboard 310 may generate an analytical summary with respect to each of the one or more service providers 302 by tracking the SLAs. The analytical summary may be generated based upon a comparison of current service levels with the expected service levels in order to track/monitor the performance as per the SLA. Further, the dashboard 310 may display the performance at various hierarchical levels including the application level, the tower level and the account level. The account may be related to a particular service provider under whom different towers associated with the services may be included. Further, at each tower of the multiple towers, an application may be included. Thus, the dashboard 310 facilitates both macro and micro level data analytics in order to monitor the performance of the one or more service providers. Further, the computation of the metric facilitates generating a report (also referred to as a "Compliance Report") depicting service level compliance data associated with the one or more service providers which may be displayed to the user via the dashboard 310. In one embodiment, a notification alert may be generated based upon the Compliance Report which may be used to notify the user of non-compliances associated with the IT services, if any.

Figure 4:
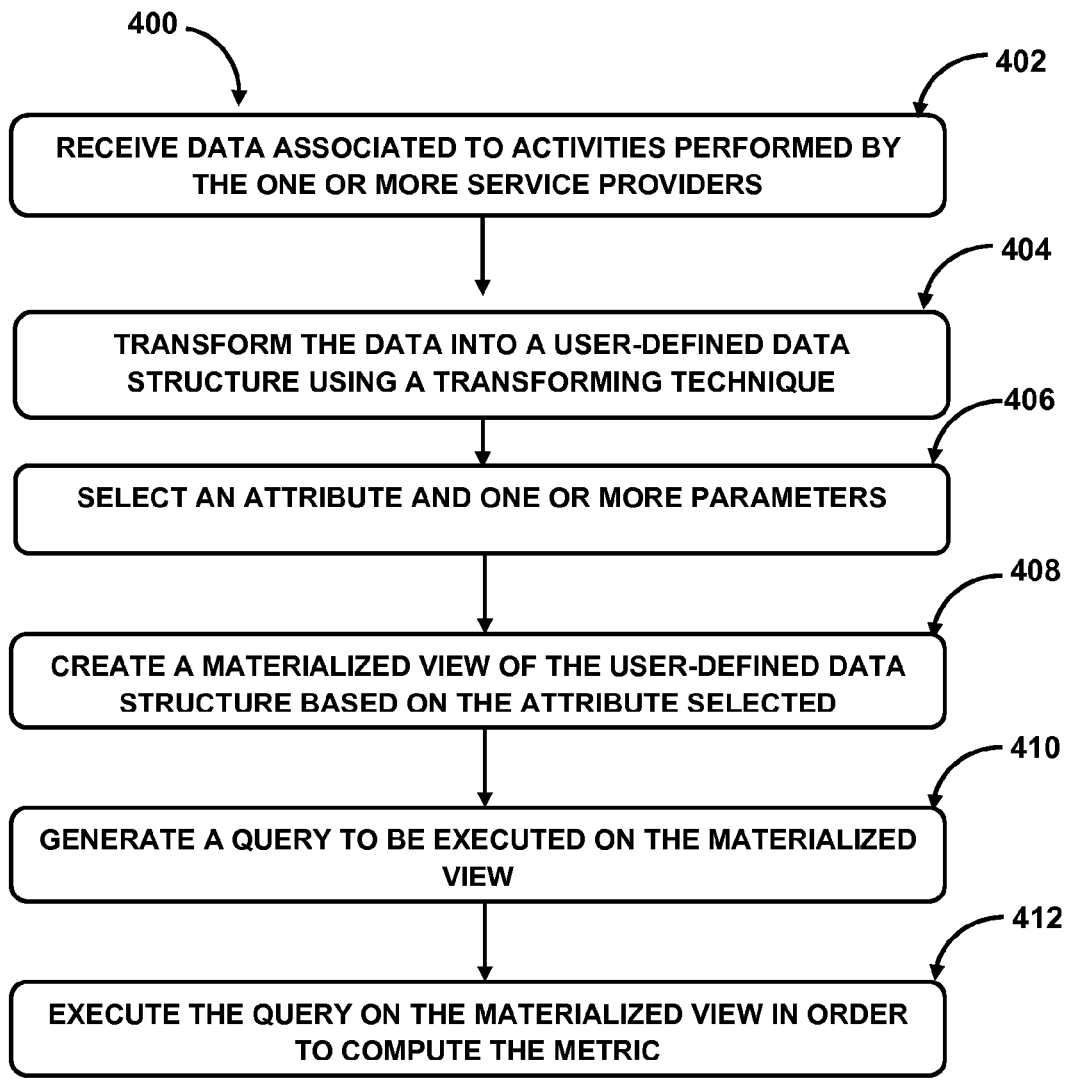
FIG. 4 illustrates a method for optimizing computation of a metric facilitating monitoring of SLAs in an IT-enabled framework, in accordance with an embodiment of the present disclosure.

Referring now to FIG. 4, a method 400 for optimizing the computation of a metric facilitating monitoring of SLAs in an IT-enabled framework is shown, in accordance with an embodiment of the present disclosure. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the disclosure described herein. Furthermore, the method can be implemented in any suitable hardware, software, firmware, or combination thereof. However, for ease of explanation, in the embodiments described below, the method 400 may be considered to be implemented as described in the system 102.

At block 402, data associated with activities performed by the one or more service providers may be received. In one implementation, the data may be received using the receiving module 212. The data may be stored in the database 226.

At block 404, the data may be transformed into a user-defined data structure using a transforming technique. In one implementation, the data may be transformed using the transforming module 214.

At block 406, an attribute of the one or more attributes and one or more parameters associated with the key performance indicator of the one or more service providers may be selected. In one implementation, the attribute and the one or more parameters may be selected by using the selecting module 216.

At block 408, a materialized view of the user-defined data structure may be created based on the selected attribute. In one implementation, the materialized view may be created by using the view creating module 218. The materialized view created may be stored in the database 226.

At block 410, a query to be executed on the materialized view may be generated. In one implementation, the query may be generated by using the query generating module 220.

At block 412, the query may be executed on the materialized view in order to compute the metric. In one implementation, the query may be executed using the metric executing module 222. The execution of the query on the materialized view facilitates in the optimization of the computation of the metric.

Although implementations for methods and systems for optimizing computation of a metric facilitating monitoring of SLAs in an IT-enabled framework have been described in language specific to structural features and/or methods, it is to be understood that the appended claims are not necessarily limited to the specific features or methods described. Rather, the specific features and methods are disclosed as examples of implementations for optimizing computation of metrics facilitating monitoring of SLAs in an IT-enabled framework.

What is claimed is:

1. A method for optimizing computation of a metric in an Information Technology (IT)-enabled framework to reduce computational overhead, the method comprising:
   providing a processor and a non-transitory memory coupled to the processor, wherein the processor is capable of executing a plurality of modules stored in the memory;
   receiving data associated with activities performed by one or more service providers;
   transforming, via the processor, the data into a user-defined data structure using a transforming technique, wherein the user-defined data structure comprises one or more attributes associated with the data;
   selecting an attribute of the one or more attributes, and one or more parameters associated with a key performance indicator of the one or more service providers;
   creating a materialized view of the user-defined data structure based on the selected attribute, wherein the materialized view includes a database table comprising a sub-set of the data, and wherein the sub-set is retrieved from the data, via the processor, based upon the selected attribute;

generating, via the processor, a query to be executed on the materialized view, wherein the query comprises the attribute and the one or more parameters; and executing the query on the materialized view, via the processor, in order to compute the metric, wherein the execution of the query facilitates the optimization of the computation of the metric.

2. The method of claim 1, wherein the transforming technique comprises an extraction, transformation, and loading (ETL) technique.

3. The method of claim 1, further comprising defining the one or more attributes, wherein a definition of each attribute includes a name of the attribute, a class type of the attribute, a data type of the attribute, and a description of the attribute.

4. The method of claim 1, wherein the one or more parameters comprises a name of the query, a description of the query, a periodicity of the query, a resource data table associated with the query, a frequency of the query, a complexity associated with the query, a service level agreement (SLA) associated with the one or more service providers, and a combination thereof.

5. The method of claim 1, further comprising a step of modifying the query based upon a selection of various filtering criteria including a grouping option, a mathematical function, a date of execution of the query, and combinations thereof.

6. The method of claim 1, wherein the computation of the metric is implemented by initiating a batch process at a pre-defined time interval.

7. The method of claim 6, wherein the computation of the metric facilitates generating a report depicting service level compliance data associated with the one or more service providers, and wherein the report enables monitoring a performance of the one or more service providers.

8. The method of claim 7, further comprising a step of generating a notification alert based upon the report.

9. A system for optimizing computation of a metric in an Information Technology (IT)-enabled framework to reduce computational overhead, the system comprising:
a processor; and
a non-transitory memory coupled to the processor, wherein the processor is capable of executing a plurality of modules stored in the memory, and wherein the plurality of modules comprise:
a receiving module that receives data associated with activities performed by one or more service providers;
a transforming module that transforms the data into a user-defined data structure using a transforming technique, wherein the user-defined data structure comprises one or more attributes associated with the data;
a selecting module that selects an attribute of the one or more attributes, and one or more parameters associated with a key performance indicator of the one or more service providers;
a view creating module that creates a materialized view of the user-defined data structure based on the selected attribute, wherein the materialized view represents a database table comprising sub-set of the data, and wherein the sub-set is retrieved from the data based upon the attribute;
a query generating module that generates a query to be executed on the materialized view, wherein the query comprises the selected attribute and the one or more parameters;
a metric executing module that executes the query on the materialized view in order to compute the metric, wherein the execution of the query facilitates the optimization of the computation of the metric.

10. The system of claim 9, wherein the query is executed by initiating a batch process at the pre-defined time interval.

11. The system of claim 10, further comprising a dashboard that generates a report depicting service level compliance data associated with the one or more service providers, wherein the report enables monitoring a performance of the one or more service providers.

12. The system of claim 11, wherein the dashboard further generates a notification alert based upon the report.

13. A computer program product having embodied thereon a computer program for optimizing computation of a metric in an Information Technology (IT)-enabled framework to reduce computational overhead, the computer program product comprising a set of instructions, the set of instructions comprising instructions for:
receiving data associated with activities performed by one or more service providers;
transforming the data into a user-defined data structure using a transforming technique, wherein the user-defined data structure comprises one or more attributes associated with the data;
selecting an attribute of the one or more attributes, and one or more parameters associated with a key performance indicator of the one or more service providers;
creating a materialized view of the user-defined data structure based on the attribute, wherein the materialized view represents a database table comprising a sub-set of the data, and wherein the sub-set is retrieved from the data based upon the selected attribute;
generating a query to be executed on the materialized view, wherein the query comprises the selected attribute and the one or more parameters; and
executing the query on the materialized view in order to compute the metric, wherein the execution of the query facilitates optimization of the computation of the metric.

14. The computer program product of 13, further comprising instructions for generating a report depicting service level compliance data associated with the one or more service providers, wherein the report enables monitoring a performance of the one or more service providers.

* * * * *